(12) United States Patent
Larzabal et al.

(10) Patent No.: US 7,110,528 B2
(45) Date of Patent: Sep. 19, 2006

(54) AMPLIFIER FOR UNSHIELDED TWISTED PAIR WIRE SIGNALS

(75) Inventors: Luis Larzabal, Mountain View, CA (US); Edward Paul Ponganis, Modesto, CA (US)

(73) Assignee: Phylogy, Inc., Sunnyvale, CA (US)

( * ) Notice: Subject to any disclaimer, the term of this patent is extended or adjusted under 35 U.S.C. 154(b) by 75 days.

(21) Appl. No.: 10/889,090

(22) Filed: Jul. 12, 2004

(65) Prior Publication Data

US 2006/0029207 A1    Feb. 9, 2006

(51) Int. Cl.
*H04B 3/38* (2006.01)
(52) U.S. Cl. .................... 379/345; 370/293
(58) Field of Classification Search ............. 379/338, 379/340, 344, 345; 370/293
See application file for complete search history.

(56) References Cited

U.S. PATENT DOCUMENTS

| | | | |
|---|---|---|---|
| 2,725,532 A * | 11/1955 | Radcliffe, Jr. | 379/345 |
| 4,331,842 A * | 5/1982 | Kiko | 379/345 |
| 5,678,198 A | 10/1997 | Lemson | |
| 6,208,732 B1 | 3/2001 | Moschytz et al. | |
| 6,459,684 B1 | 10/2002 | Conroy et al. | |
| 6,507,606 B1 * | 1/2003 | Shenoi et al. | 379/344 |
| 6,798,769 B1 | 9/2004 | Farmwald | |
| 2002/0031113 A1 | 3/2002 | Dodds et al. | |
| 2002/0171475 A1 | 11/2002 | Picha et al. | |
| 2003/0007632 A1 | 1/2003 | Schoessow | |

* cited by examiner

*Primary Examiner*—Daniel Swerdlow
(74) *Attorney, Agent, or Firm*—Barry N. Young

(57) ABSTRACT

An analog electronic circuit is placed between the central office of a telecommunications provider and the customer premises equipment of a digital subscriber line system which uses unshielded twisted pair wires ("UTP"). The electronic circuit separates the downlink signals from the uplink signals with a first mixer. The voice signals, if present, are routed around the electronic circuit unmodified. The downlink signals are amplified, filtered, amplified again with a one or more peaking equalization amplifier, then amplified with drivers which provide the power to drive the downlink signal through a second mixer onto the UTP lines to the customer premises equipment. The electronic circuit separates the uplink signals from the downlink signals with the second mixer. The uplink signals are amplified, filtered, and amplified again, then driven onto the UTP connected with the central office through the first mixer.

25 Claims, 17 Drawing Sheets

| A | B | C | D |
|---|---|---|---|
| Dist to CPE, ft | Rdcf | Rddg | Rudg |
| 3,000 | 330 | 1,100 | 1050 |
| 4,000 | 730 | 1,100 | 850 |
| 5,000 | 930 | 1,100 | 850 |
| 6,000 | 930 | 1,100 | 850 |
| 7,000 | 930 | 1,100 | 850 |
| 8,000 | 930 | 1,100 | 850 |
| 9,000 | 930 | 1,100 | 850 |
| 10,000 | 1,330 | 300 | 250 |
| 11,000 | 1,300 | 100 | 50 |
| 12,000 | 1,330 | 100 | 50 |
| 13,000 | 1,330 | 100 | 50 |

FIG 14

AMPLIFIER FOR UNSHIELDED TWISTED PAIR WIRE SIGNALS

FIELD OF THE INVENTION

The present invention pertains to analog amplifiers, specifically amplifiers for use with unshielded twisted pair wires.

BACKGROUND OF THE INVENTION

Users of data communications continue to demand ever faster service. Acoustical modems are typically able to deliver a maximum of fifty six thousand bits per second (kbps). Higher speed broadband connections have encouraged content providers to provide services that are not practical at lesser speeds, typically requiring a minimum of 150 kbps. Digital Subscriber Lines ("DSL") offer speeds up to several megabits per second (Mbps), depending upon distance from the telephone service provider's Central Office ("CO") to the Customer Premises Equipment ("CPE") and the user's willingness to pay a premium. At certain distances high speed DSL is not available at any reasonable price simply because the technology is not able to do so. Typically consumer speed DSL is not offered by the telecommunications companies at greater than about 2.5 miles from the CO. Thus the service area of providers is limited by the number of COs and their proximity to each other. This limit is the result of DSL vendors' utilization of the existing unshielded twisted pair ("UTP") copper wire network that has been the mainstay of the telephone infrastructure from the inception of commercial telephony. An advantage of UTP is that it is into virtually every home and business by virtue of its use for carrying ordinary telephone connections. A disadvantage of UTP is that it is not well suited for high frequency signals in that the high frequencies necessary for the data rates desired are strongly attenuated by the wire media itself. This is the result of the build up of impedance with wire length.

A competing broadband service is offered by television cable companies, wherein optical fiber service is installed into a neighborhood. A limited number of subscribers may then share the total bandwidth available up to approximately 1.25 miles from the termination end of the fiber connection via coaxial wire. Cable broadband speeds are often over 1 Mbps. To compete with the cable providers for broadband coverage as well as speed, the DSL providers are forced to also install more fiber connections, farther away from the CO, from which the DSL UTP lines may spawn. The installation of fiber is very costly in terms of labor, materials, and in some cases access rights. Though in the United States broadband cable currently has more market share than DSL, total market penetration of broadband service is very small. Thus the competition for share is very open.

There would be economic and time to market advantage to the DSL providers if they could economically extend their market coverage with the existing UTP infrastructure and do so at a data rate that is competitive with broadband cable. The prior art has been largely based upon repeaters which receive the DSL signal, decode it using the pertinent protocol for error detection and correction, then reformulate the data and retransmit it with a rejuvenated signal. Such approaches are very costly. Other products of the relevant art utilize the UTP infrastructure but require the telecommunications companies to install different equipment at the CO and CPE, which is expensive.

The present invention provides for the extension of the DSL service range via existing UTP lines with no change of equipment or software at the CO or at the CPE, often with a higher data rate than currently available. It is an objective of the present invention to enable DSL service providers to economically extend their market coverage, compete with broadband cable providers in terms of speed, and to enable them to roll out coverage and service improvements more rapidly than broadband cable suppliers due to lower capital needs for infrastructure extension.

DSL technology is based upon a bidirectional connection between a Digital Subscriber Line Access Multiplexer ("DSLAM") board at the CO and a DSL modem at the customer's premises. There is a one for one relationship. That is, a single, dedicated set of twisted pair wires extends from a single port on the DSLAM to the customer's DSL modem. No other subscriber is served by that same set of wires. A splitter at or near the premises entry point divides the frequency spectrum assigned to the analog voice signal (if present) from the spectrum dedicated to DSL use. The lower 30 khz is reserved for the voice signals. The DSL signals are assigned one or more separate, non-overlapping frequency bands for the "uplink" (towards the CO) direction and one or more non-overlapping frequency bands for the "downlink" (towards the CPE) direction. The data flowing in these two directions are independent of each other and flowing simultaneously, just in different directions through the same media at the same time, separated by frequency, not by time. Thus any device that is inserted between the premises splitter and the CO DSLAM must accommodate signals ranging from near dc to 1100 khz or more, without regard to direction, where "direction" distinguishes at which end of the connection is the transmitter (at the CPE for the uplink, at the CO for the downlink) and at which end is the receiver (at the CPE for the downlink, at the CO for the uplink).

The Asymmetrical DSL ("ADSL", ADSL meaning the downlink data rate is not the same as the uplink data rate) and Symmetrical DSL ("SDSL") standards for transmission are for the voice, uplink, and downlink signals to be present on the UTP simultaneously. This is in contrast to High Bit Rate DSL ("HDSL") wherein the downlink data is applied to one UTP set, the uplink to another UTP set, and the voice data is not carried at all by the system. The industry standard (described in ANSI T1.417 and others) segregates various categories of data by frequency range.

In the 1100 khz bandwidth of the G.992.1 (ADSL) standard there are two hundred and fifty six 4.3125 khz "buckets". The signal present on an ADSL physical wire line is called a Digital Multi-Tone (DMT) because it is comprised of the energy of different frequency tones. The higher frequency buckets of the DMT signal suffer greater attenuation as UTP wire line length increases. Consequently, the higher frequency buckets are hampered in their ability to effectively carry data relative to those buckets of lower frequency.

For ADSL, the portion of the bandwidth from approximately 0 Hz (bucket 0) to 30 khz (bucket 7) is reserved for the voice channel and other signaling. The portion of the bandwidth from approximately 34 khz (bucket 8) to 125 khz (bucket 29) is assigned to the ADSL upstream channel, thus comprising the next 22 buckets. As UTP wire line increases in length, fewer upstream buckets are able to carry data, resulting in a reduction in upstream data rate.

The portion of the bandwidth from approximately 164 khz (bucket 38) to 1100 khz (bucket 255) is assigned to the downstream channel, thus comprising the upper 218 buckets. As UTP wire line increases in length, fewer downstream buckets are able to carry data, resulting in a reduction in downstream data rate. The data rate is negotiated between the CO and the CPE.

Beyond approximately 18,000 feet of commonly used UTP phone wire, most of the corresponding bandwidth is so attenuated, with most downstream buckets rendered useless, that communication per the ADSL standard ceases altogether.

In the general case, any number of non-overlapping frequency bands may be assigned for uplink and downlink data, presumably the two being interleaved. For example, FIG. 1 illustrates a generalized assignment scheme for interleaved DSL. FIG. 2 illustrates the frequency band assignment standard for ADSL, wherein only one band (34 khz to 125 khz) is assign to uplink data and only one band (164 khz to 1100 khz) is assigned to downlink data. The spectrum above 1100 khz is not utilized. Other standards are evolving that may assign somewhat different frequency blocks and/or utilize a higher maximum frequency. One skilled in the art will understand that the present invention is applicable to such different frequency assignments by selecting different component values for the various circuit blocks described herein such that they are tuned to filter out or pass or amplify in the appropriate frequency ranges.

The present invention operates on ISO OSI model Layer 1. That is, it is a purely analog device with no software or comprehension of protocols or frames. It takes a weak, noisy signal, cleans it up and amplifies it. Thus it is useful regardless of what protocol the signals may represent. Those skilled in the pertinent art will understand its applicability in improving signal quality within any UTP transmission system.

SUMMARY OF THE INVENTION

An electronic circuit is inserted between a telecommunications central office and the customer premises equipment of an unshielded twisted pair DSL connection. The signals, having been separated as to downlink or uplink by assigned frequency bands, are separated for separate signal conditioning. The downlink signals, typically of a higher frequency than the uplink signals, are separated, amplified, filtered, equalized, amplified, and driven onto the UTP connection to the CPE. The uplink signals are separated, amplified, filtered, amplified, and driven onto the UTP connection to the CO. In another embodiment the uplink signals are separated, amplified, filtered, equalized, amplified, and driven onto the UTP connection to the CO. Any voice signals are passed bi-directionally, unmodified, around the active circuitry by a low pass filter for connection with the uplink and downlink signals on the UTP. In another embodiment the uplink and downlink signals do not share a common set of UTP wires and are amplified without mixing or filtering.

BRIEF DESCRIPTION OF THE DRAWINGS

FIG. 14 is a table of values for certain components as a function of distance from the CO and CPE.

DETAILED DESCRIPTION OF THE INVENTION

In one embodiment of the present invention an analog circuit is inserted in a UTP line at an appropriate distance between the CO and the CPE. It is an apparatus which separates the three or more frequency bands (assigned to voice if present, uplink(s), and downlink(s)). The present invention passes any voice signals through unmodified, filters and amplifies the uplink and downlink signals, then recombines any voice signal with uplink or downlink data signals as appropriate. Thus the telephone at the user's premises will continue to operate unchanged if the inserted device should fail for a power failure or the like. This satisfies the industry requirement that connectivity with the emergency number 911 not be compromised.

Figure 1:
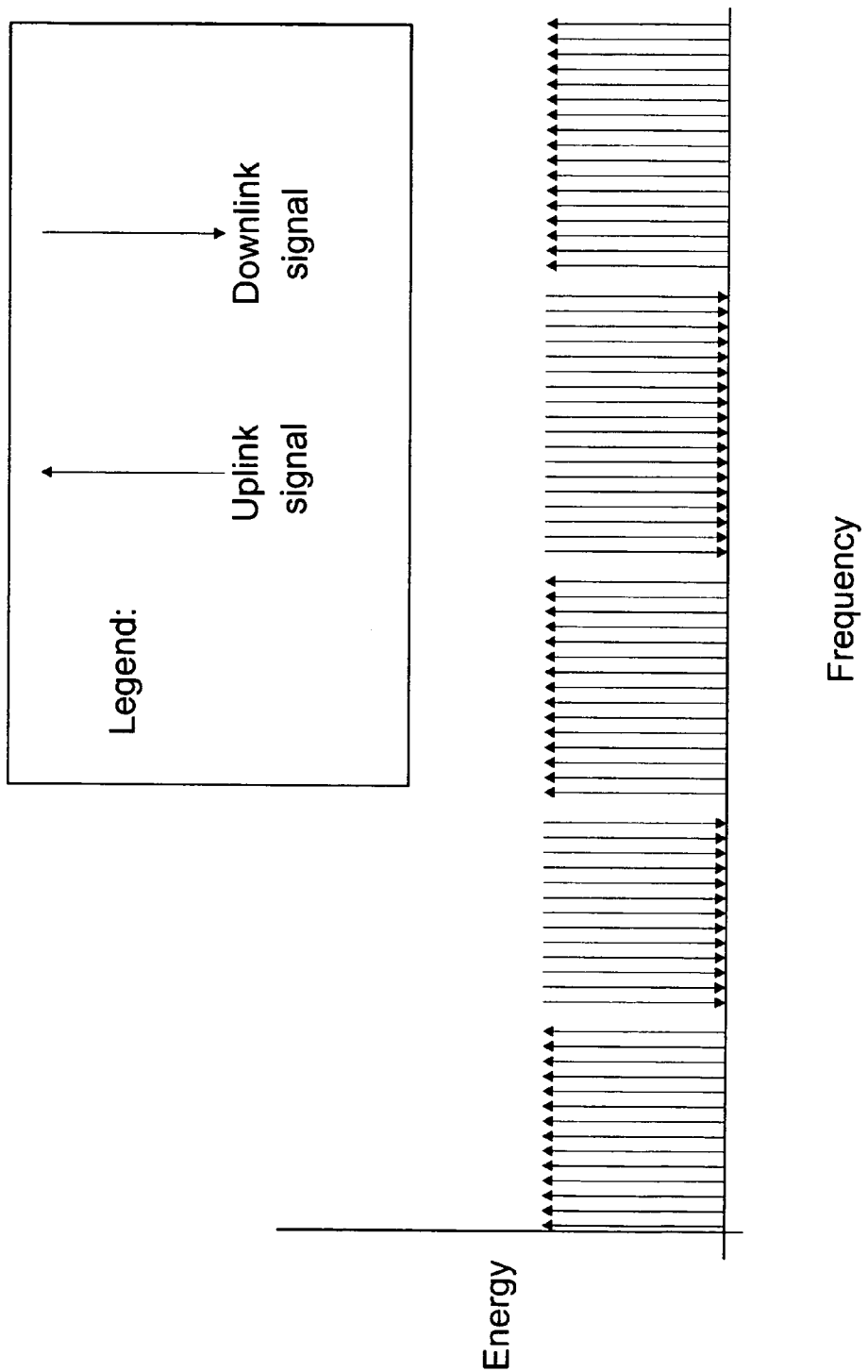
FIG. 1 shows frequency band assignments for an interleaved system.
Figure 3A:
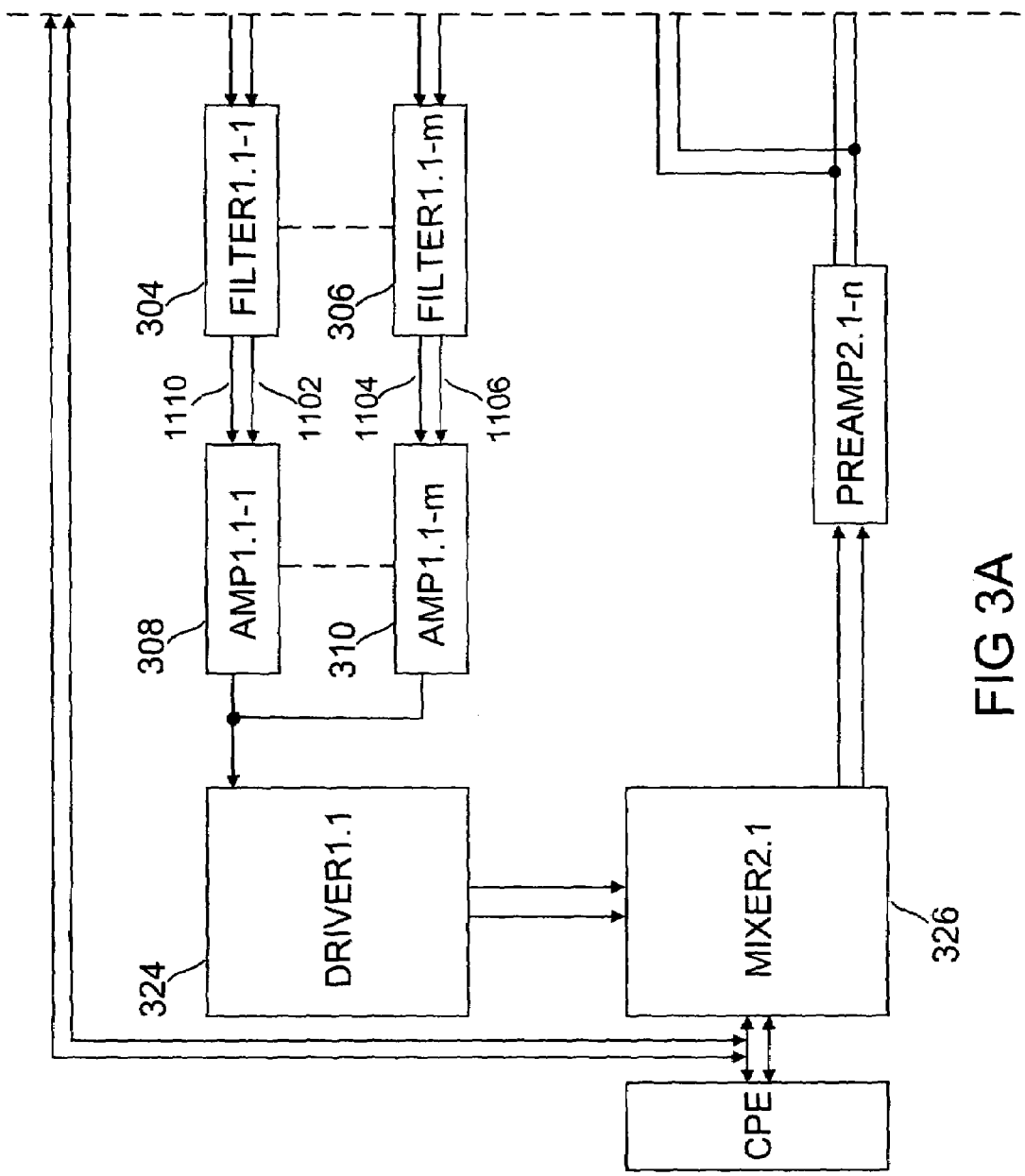
FIG. 3 is a block diagram of the present invention in a generalized form.
Figure 3B:
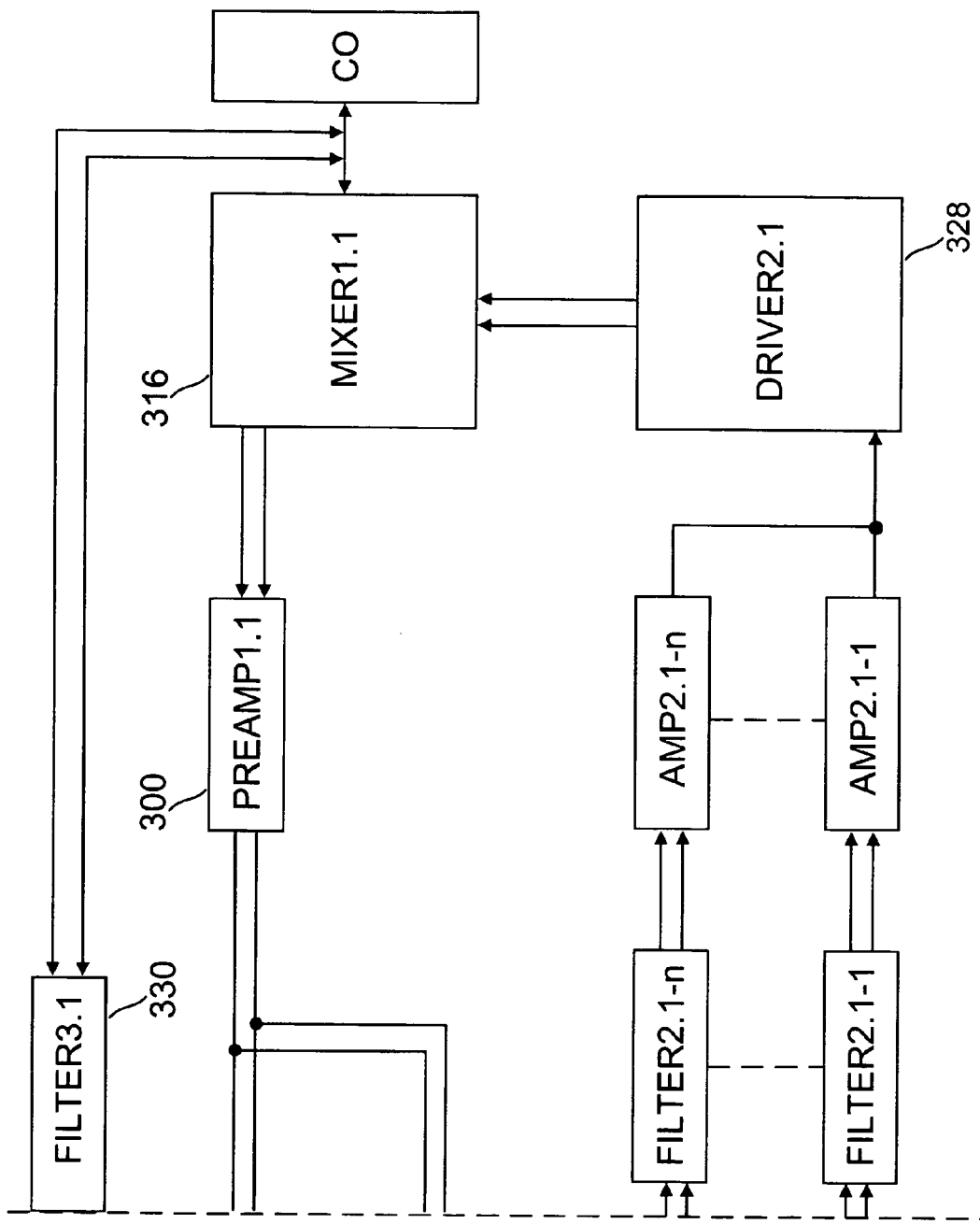

FIG. 3 illustrates one embodiment of the present invention, suitable for a frequency assignment scheme wherein a plurality of "m" downlink and a plurality of "n" uplink frequency bands are specified, one example of which is illustrated in FIG. 1. The UTP lines from the CO are connected with a mixer/splitter MIXER1.1 316. A preamplifier PREAMP1.1 300 and one or more band pass filters (FILTER1.1-1 304 through FILTER1.1-$m$ 306) are provided for each of m downlink frequency bands, each filter tuned appropriately for a specific frequency band. The output of the filter(s) is connected with a matching number of amplifiers, AMP1.1-1 308 through AMP1.1-$m$ 310. The amplifier outputs are provided to a DRIVER1.1 324, which drives signals through MIXER2.1 onto UTP lines which go to the CPE splitter. The uplink signals from the CPE are treated in a similar manner. The uplink signals, as shown in FIG. 1, are assigned n bands. If present, voice signals are not processed but instead passed around the active circuitry via a low pass filter FILTER3.1 330.

Figure 2:
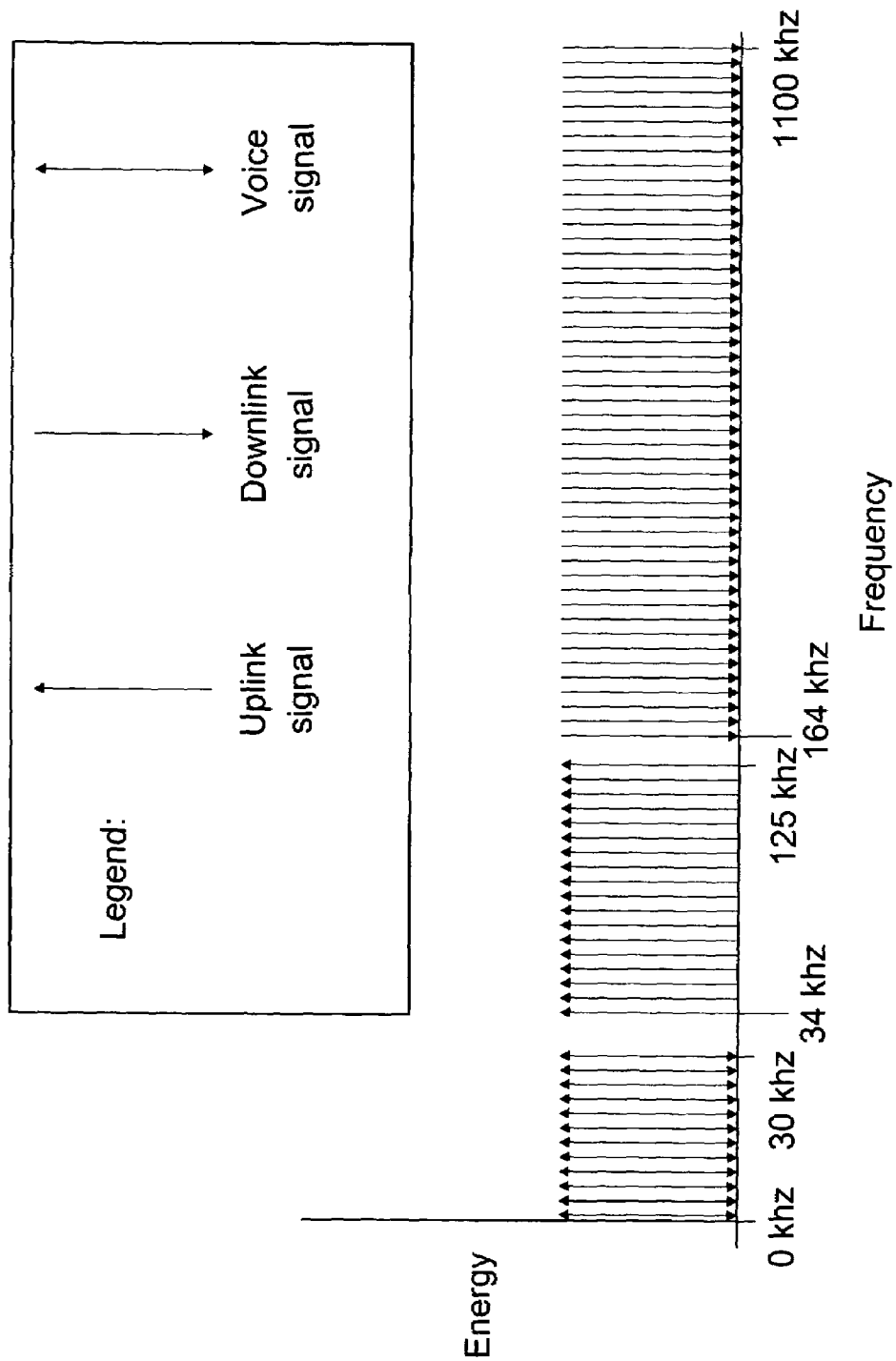
FIG. 2 shows frequency band assignments for an ADSL system.
Figure 4:
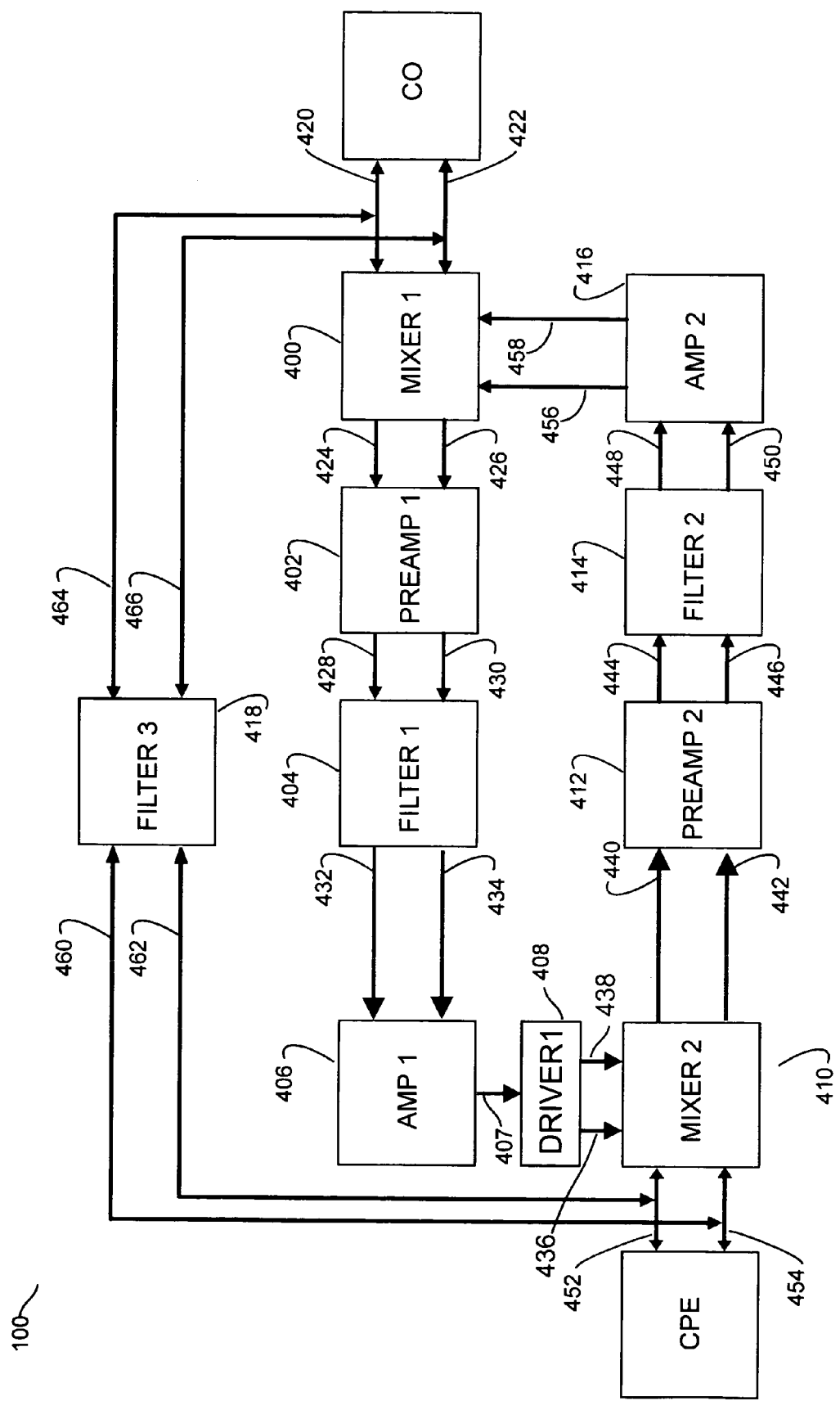
FIG. 4 is a block diagram of the present invention, showing its major functional blocks and the direction of signal flow for an ADSL implementation.

FIG 4 illustrates an embodiment for an ADSL system. The example frequency band assignments for an ADSL signal are shown in FIG 2. A preamplifier and a filter are needed for the uplink and for the downlink frequency bands plus a low pass filter for the voice band. An inserted device, termed a Bi-directional Differential Broadband Equalizing Amplifier 100 ("BDBEA"), is connected with the CO at one end via differential signals on lines 420 and 422 and the CPE at the other end via differential signals on UTP lines 452 and 454. Looking first at the end connected with the CO, the first element is MIXER1 400 which has three purposes: 1) block the voice signals on lines 420 and 422 from entering PREAMP1 402, 2) split out the uplink signals on lines 456 and 458 from the downlink signals on lines 420 and 422, 3) mix in the uplink signals from AMP2 416 on lines 456 and 458 with the voice signals on lines 464 and 466. Thus MIXER1 400 is a blocker, a splitter, or a mixer, depending upon frequency band and to which port of MIXER1 400 each signal is applied. Six db of the downlink signal is lost through MIXER1 400.

For the downlink direction the next stage is PREAMP1 402, connected with MIXER1 400 by lines 424 and 426. PREAMP1 402 provides approximately 12 db of gain to the downlink signal and to the residual amplified (by AMP2 416) uplink signal, since all of the uplink signal is not cancelled by MIXER1 1. At the output of PREAMP1 402 the voltage level of the unwanted uplink signal is significantly higher than that of the downlink signal. The downlink signal would appear as ripple riding upon the uplink signal. Thus FILTER1 404 is needed to filter out the uplink signal, leaving the desired downlink signal.

The input of FILTER1 404 is connected with the output of PREAMP1 402 by lines 428 and 430. The signals assigned the frequency band below the downlink band is the uplink band and there are no signals assigned a frequency band higher that that of the downlink band. Thus FILTER1 404 is a high pass filter whose cutoff frequency is just below 165 khz. At the output of FILTER1 404 the only signal remaining is the downlink signal, the uplink signal now being approximately 70 db below the downlink signal. The output of FILTER1 404 is connected with the input to AMP1 406 by lines 432 and 434. Approximately 6 db of the downlink signal is lost through FILTER1 404.

The remaining downlink signal is amplified strongly by a peaking equalization amplifier AMP1 406, providing approximately 28 db to 46 db of gain, depending upon frequency.

Equalization is the increase or decrease of signal strength at a certain "set frequency" with less effect at other frequencies. A peak equalizer amplifies at the designed-for set frequency and a range of frequencies close to the set frequency. The Q of the design sets the width of the band of frequencies that will be amplified; it affects the range of frequencies around the set frequency that will have an approximately similar amount of amplification. Equalization affects the data carrying ability of the buckets because it changes the strength relationship of the fundamental and harmonic frequencies.

Since the BDBEA 100 is placed between the CO and CPE, the peak equalizer's set frequency and Q for the downstream signals in one embodiment compensates for signal attenuation already caused by the effects of wire line length from the CO to the BDBEA 100, and pre-compensates for the anticipated signal attenuation from the effects of wire line length from the BDBEA 100 to the CPE. This causes the downlink data signals to arrive at the CPE modem pre-equalized.

The output of AMP1 406 on line 407 is single ended and not strong enough to adequately drive UTP lines 452 and 454. So line 407 is connected with DRIVER1 408, which increases signal strength and provides a differential signal to MIXER2 410 on lines 436 and 438.

In one embodiment for an ADSL system, wherein the downlink signals are assigned to a much higher frequency range than the uplink signals, equalization and pre-compensation are utilized only on the downstream signals. In another embodiment equalization and pre-compensation are used on most or all uplink and downlink frequency bands.

MIXER2 410 connects with the CPE splitter and subsequently the CPE DSL modem on UTP lines 452 and 454. Thus the incoming downlink signal has been cleaned up, amplified, and retransmitted via the UTP, along with the voice signals from lines 460 and 462.

In one embodiment for an ADSL application the uplink path through the BDBEA 100 is nearly identical to that of the downlink path. The differences are that AMP2 416 is not an equalization amplifier and there is no driver stage between AMP2 416 and MIXER1 400. An equalization amplifier is not necessary in an ADSL system for the uplink direction because the lower frequency spectrum assignment causes the uplink signals to not experience as much signal loss as do the downlink signals. Also, FILTER2 414 is different from FILTER1 404 in that FILTER2 414 is a low pass filter, filtering out any downlink signal that is still present on lines 444 and 446. The final stage in the uplink direction is AMP2 416, providing approximately 6 db to 26 db of gain before being mixed by MIXER1 400 and subsequently transmitted to the CO on UTP lines 420 and 422, along with the voice signals from lines 464 and 466.

MIXER1 400 and MIXER2 410 are identical circuits. MIXER1 400 is explained in detail; one skilled in the art will recognize the corresponding details for MIXER2 410.

Figure 5:
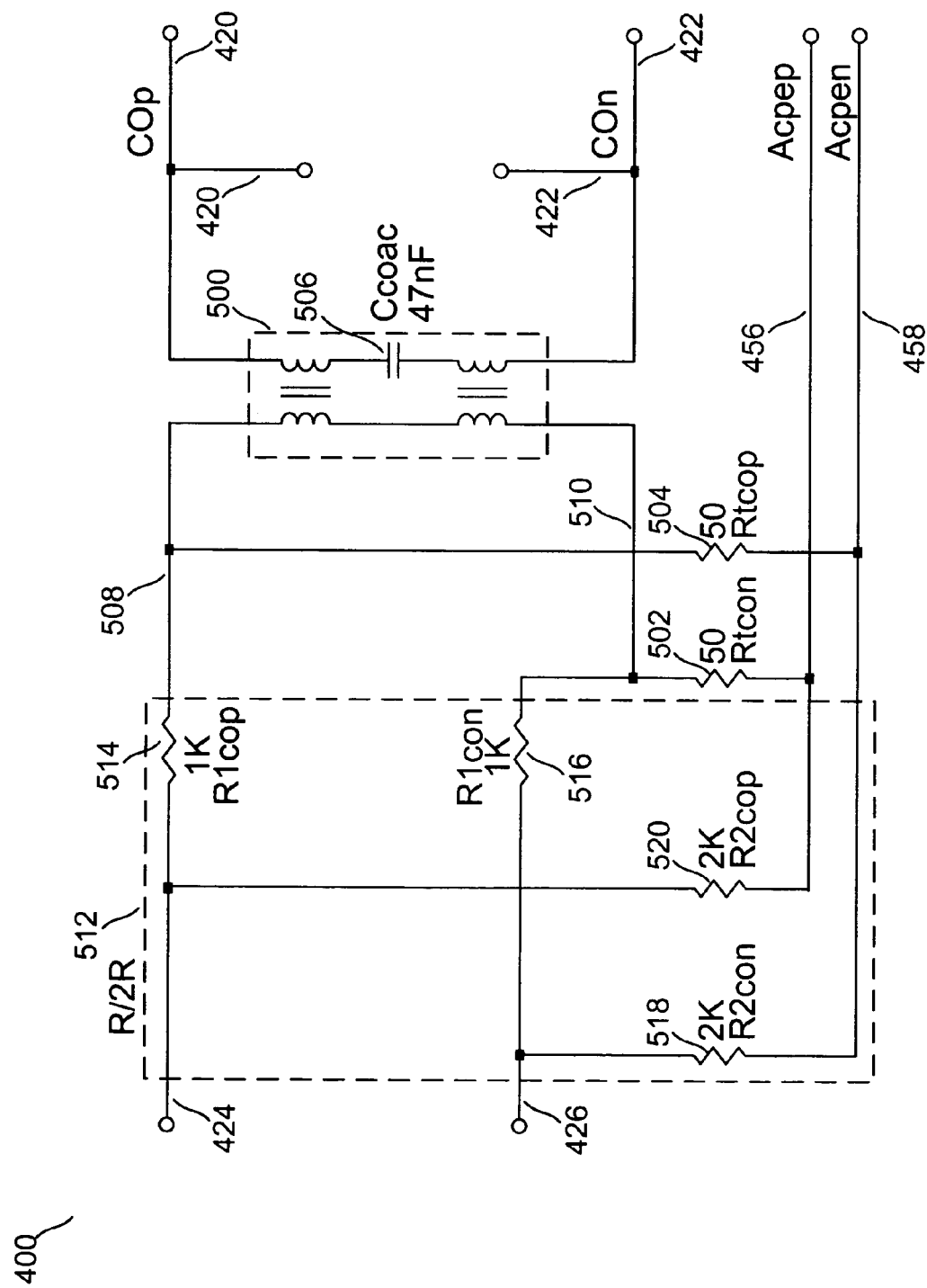
FIG. 5 is a schematic of MIXER1.

Referring to FIG. 5, the positive and negative signals COp and COn on lines 420 and 422 come from the CO. The entire dc to 1100 khz signal is carried by these lines. A DSL transformer 500 isolates the CO signals from the BDBEA 100, and also effectively blocks the dc to 30 Khz voice signals. At the same time signals Acpep and Acpen are presented by AMP2 416 on lines 456 and 458 at a very high level, much higher than the downstream signal coming from the output of transformer 500. The left side of transformer 500 (as viewed in FIG. 5) represents the secondary side of a transformer as seen by the downlink signal. But it also represents the primary side of a transformer as seen by the (amplified) uplink signals Acpep and Acpen. This is the dual nature of MIXER1 400 and MIXER2 410; both input and output, the very definition of bi-directionality. It is important that the impedance of transformer 500 presented to the CO closely match that of the CO, namely 100 ohms, an industry standard. This is accomplished by 50 ohm resistors Rtcon 502 and Rtcop 504 in series with what the uplink signal considers the primary side of transformer 500. A capacitor Ccoac 506 blocks any dc component from going through the primary side of transformer 500.

Transformer 500 outputs 508 and 510 are connected with an R/2R hybrid coupler 512, comprised of resistors R1cop 514, R1con 516, R2con 518 and R2cop 520. Hybrid coupler 512 causes an approximately 6 db reduction in signal strength of the unwanted uplink signal of the mixed signal presented to PREAMP1 402 on lines 424 and 426. The values of resistors 514, 516, 518, and 520 are not critical, only their ratio of 2:1. Nominal values are suggested in FIG. 5.

Figure 6:
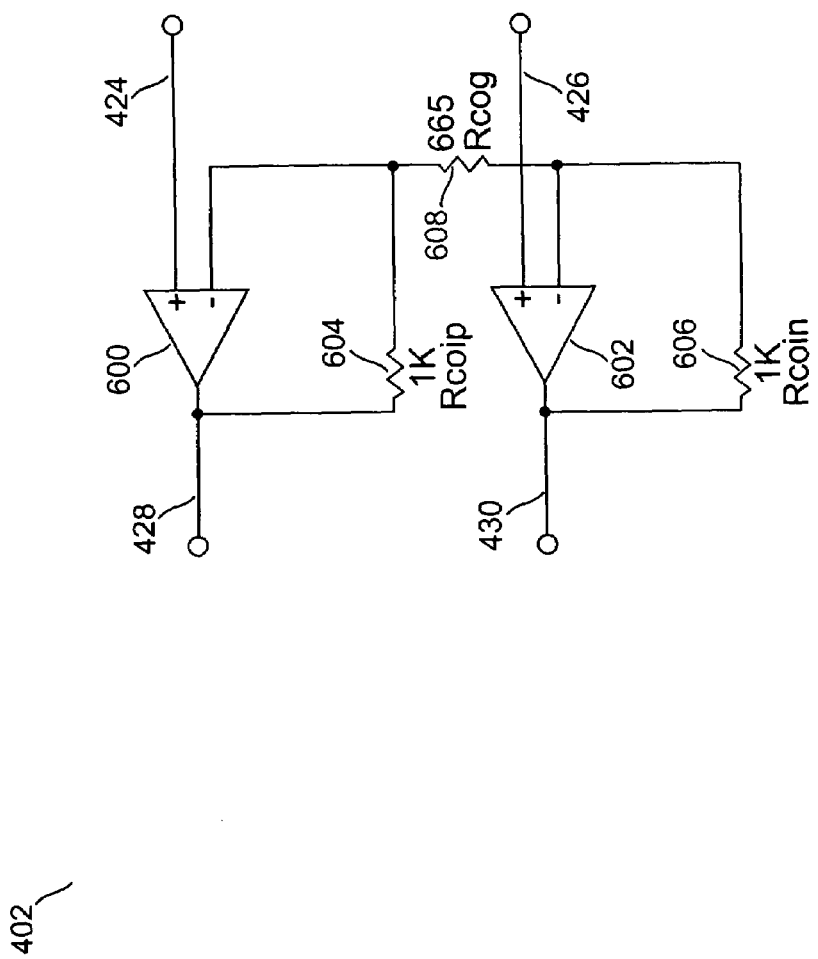
FIG. 6 is a schematic of a preamplifier.

Refer now to FIG. 6, detailing broadband PREAMP1 402. PREAMP1 402 and PREAMP2 412 are architecturally identical but may have different gains. One skilled in the art will understand the use of PREAMP2 412 from this description. The input to PREAMP1 402 is the signals on lines 424 and 426, the output of MIXER1 400. At this point the signal contains the downlink signal plus some remaining uplink signal. Filter stage FILTER1 404 will remove the remaining uplink signal, but needs good signal strength to work with, thus the need for amplification by PREAMP1 402. PREAMP1 402 is a differential amplifier. The phase relationship between the signals on lines 424 and 426 is preserved by connecting them to the non-inverting input of amplifiers 600 and 602 respectively. The gain of the amplifiers is controlled by feedback resistors Rcoip 604, Rcoin 606, and Rcog 608. The manufacturer's specification for opamps 600 and 602 should be consulted for recommended values for Rcoip 604 and Rcoin 606. The resulting gain through PREAMP1 402 is approximately 12 db. Care should be taken with PREAMP1 402 and PREAMP2 412 to insure that clipping does not occur. The differential output lines 428 and 430 are connected with high pass filter FILTER1 404.

Figure 7:
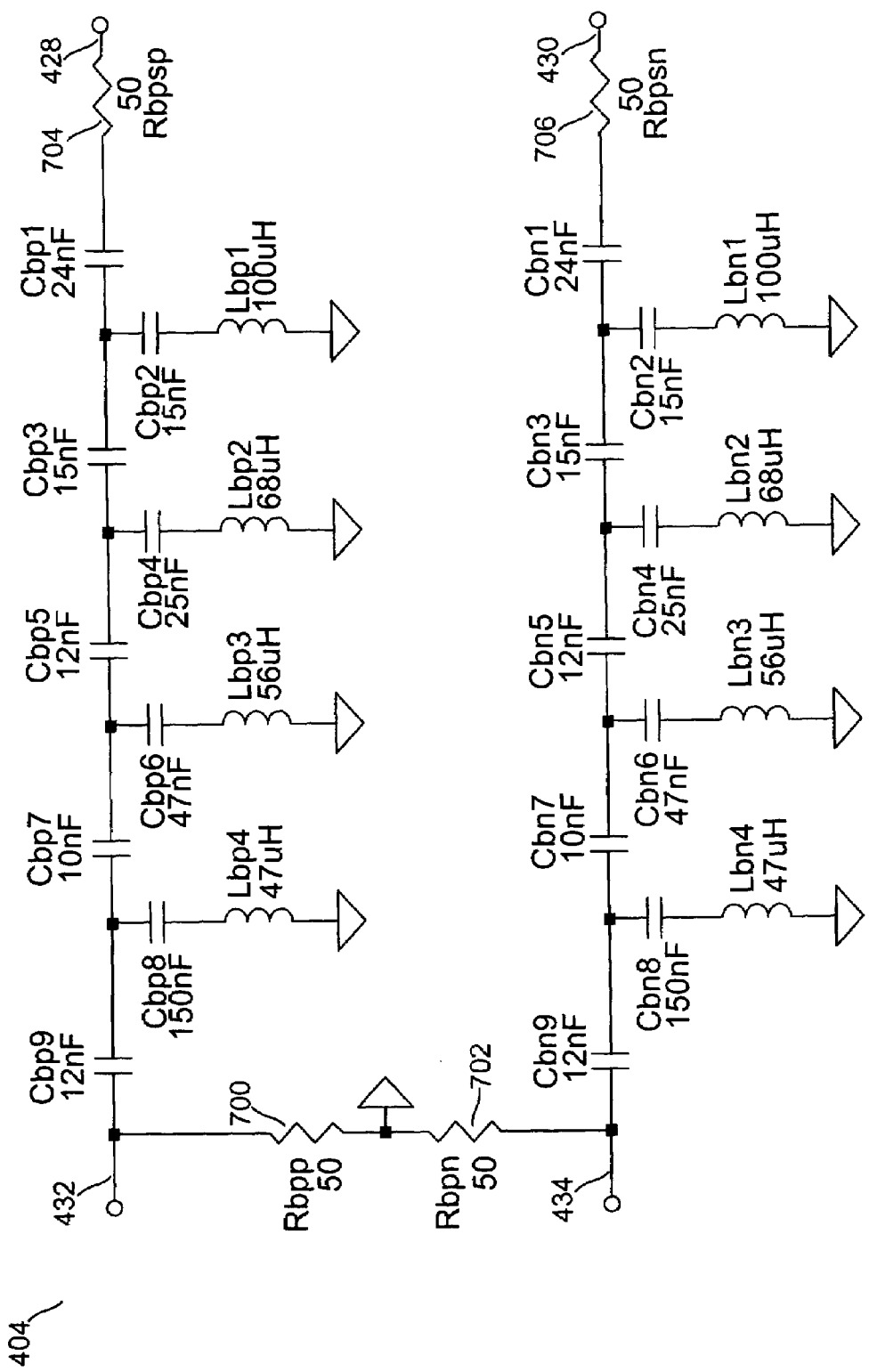
FIG. 7 is a schematic of high pass filter FILTER1.

FILTER1 404 is shown in detail in FIG. 7. In one embodiment FILTER1 404 is a ninth order elliptical filter. One skilled in the art would know of other suitable high pass filters. The implementation of FILTER1 404 is not critical, only that one use a high pass filter providing strong attenuation of signals below 164 khz with little or no attenuation above 164 khz. Resistors Rbpp 700, Rbpn 702, Pbpsp 704, and Pbpsn 706 are for impedance matching. FILTER1 404 is connected with PREAMP1 402 via lines 428 and 430. The output of FILTER1 404 is on lines 432 and 434, connecting with AMP1 406.

Figure 8:
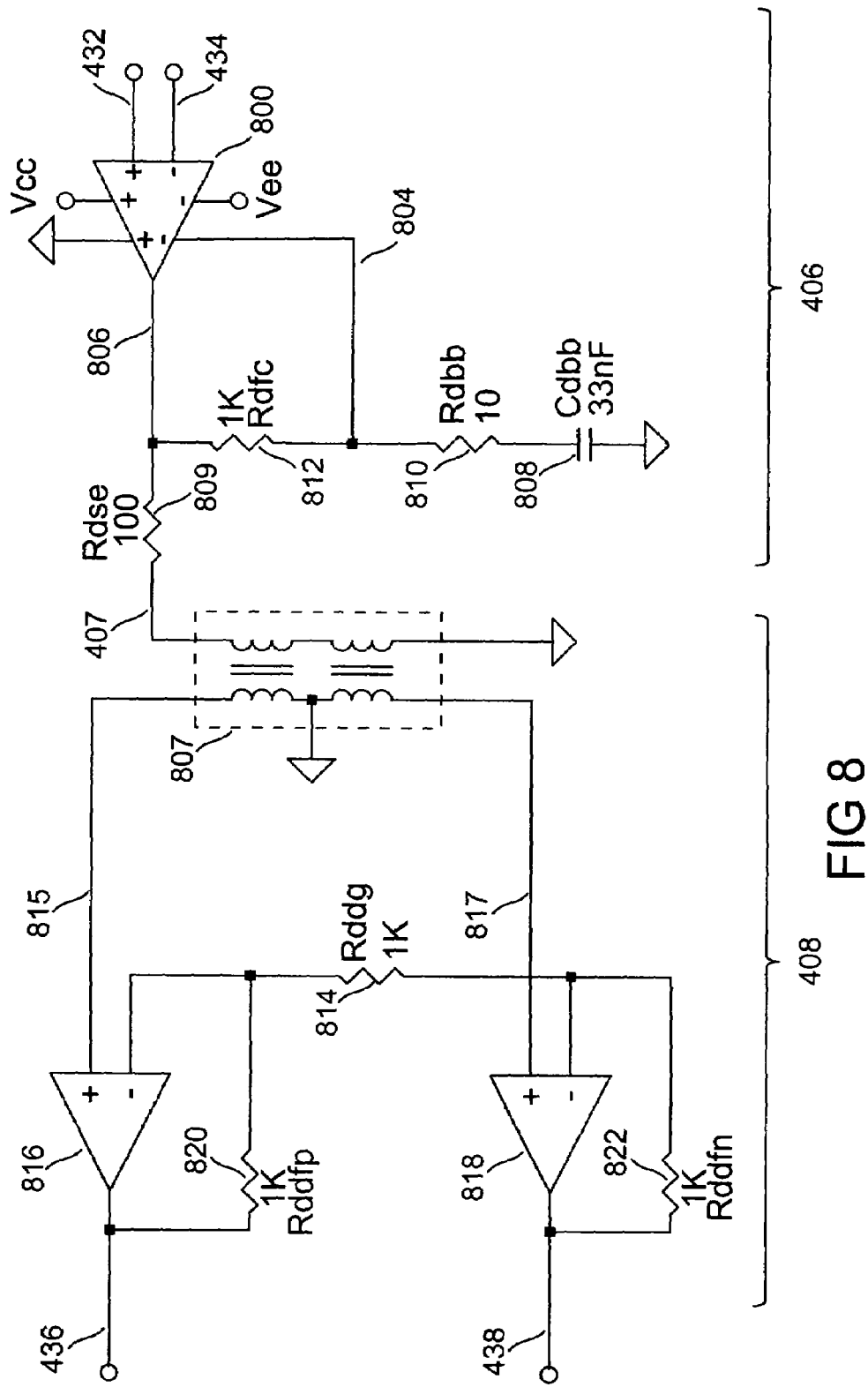
FIG. 8 is a schematic of equalization amplifier AMP1.

AMP1 406 is a peaking equalization amplifier. Referring to FIG. 8, the input signals from FILTER1 404 via lines 432 and 434 are connected with a video difference amplifier 800. The gain of video difference amplifier 800 is controlled by the voltage on line 804. Line 802 is connected with ground. The gain is determined per the relationship $$Gain_{800} = \frac{Z(Rdfc)}{Z(Rdbb, Cdbb)} + 1.$$

The peak gain frequency of the video difference amplifier 800 is strongly controlled by capacitor Cdbb 808. The peak gain frequency goes down as the value of Cdbb 808 goes up. The DSLAM at the CO and the CPE negotiate the data rate between them. They will pack most of the data into the lower buckets, where there is less loss than in the upper buckets, which are assigned higher frequencies. Accordingly the peak gain frequency in one embodiment is set somewhat below the highest frequency of the downstream band.

Figure 13A:
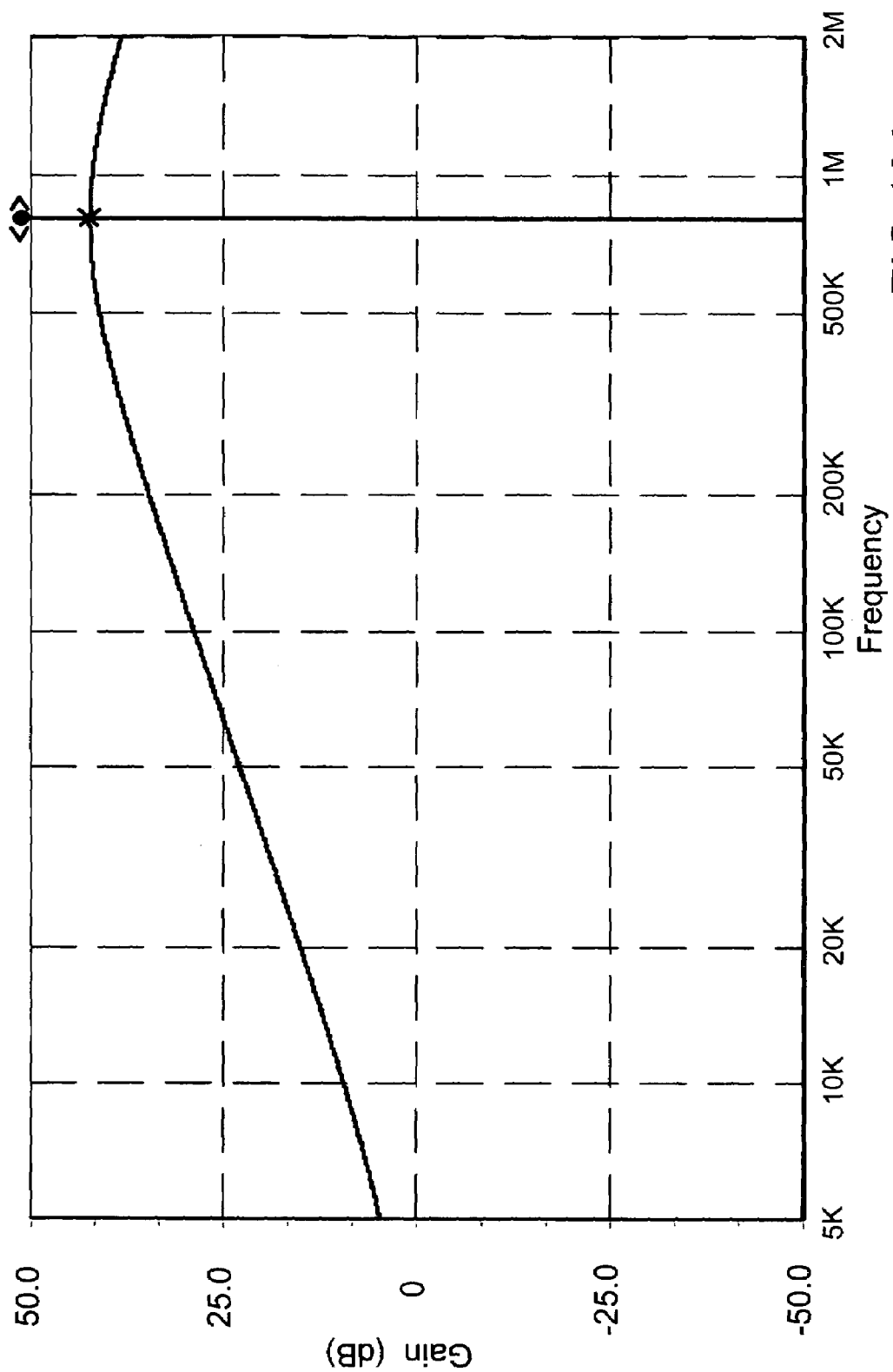
FIG. 13 is a set of SPICE simulations for AMP1.
Figure 13B:
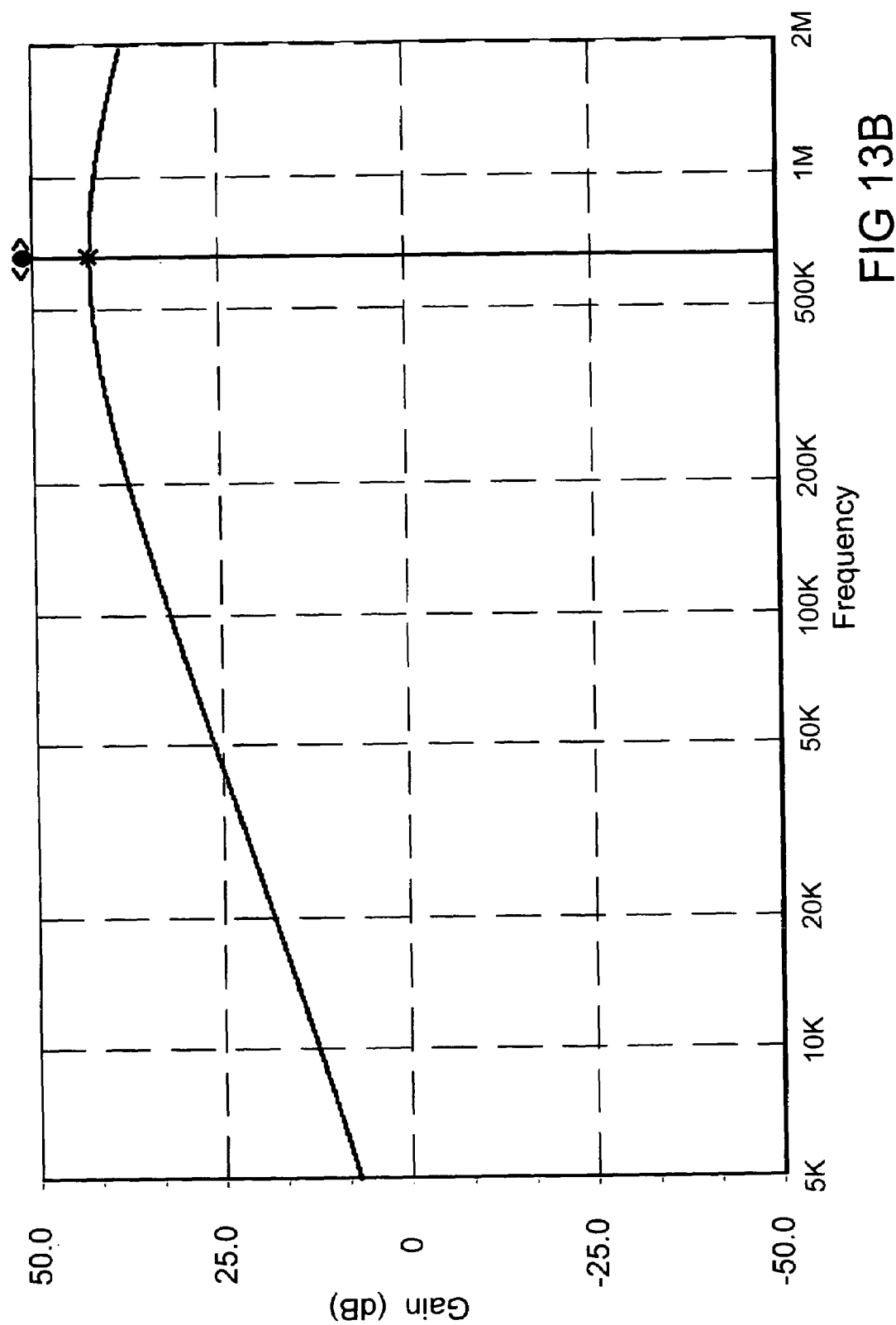
Figure 13C:
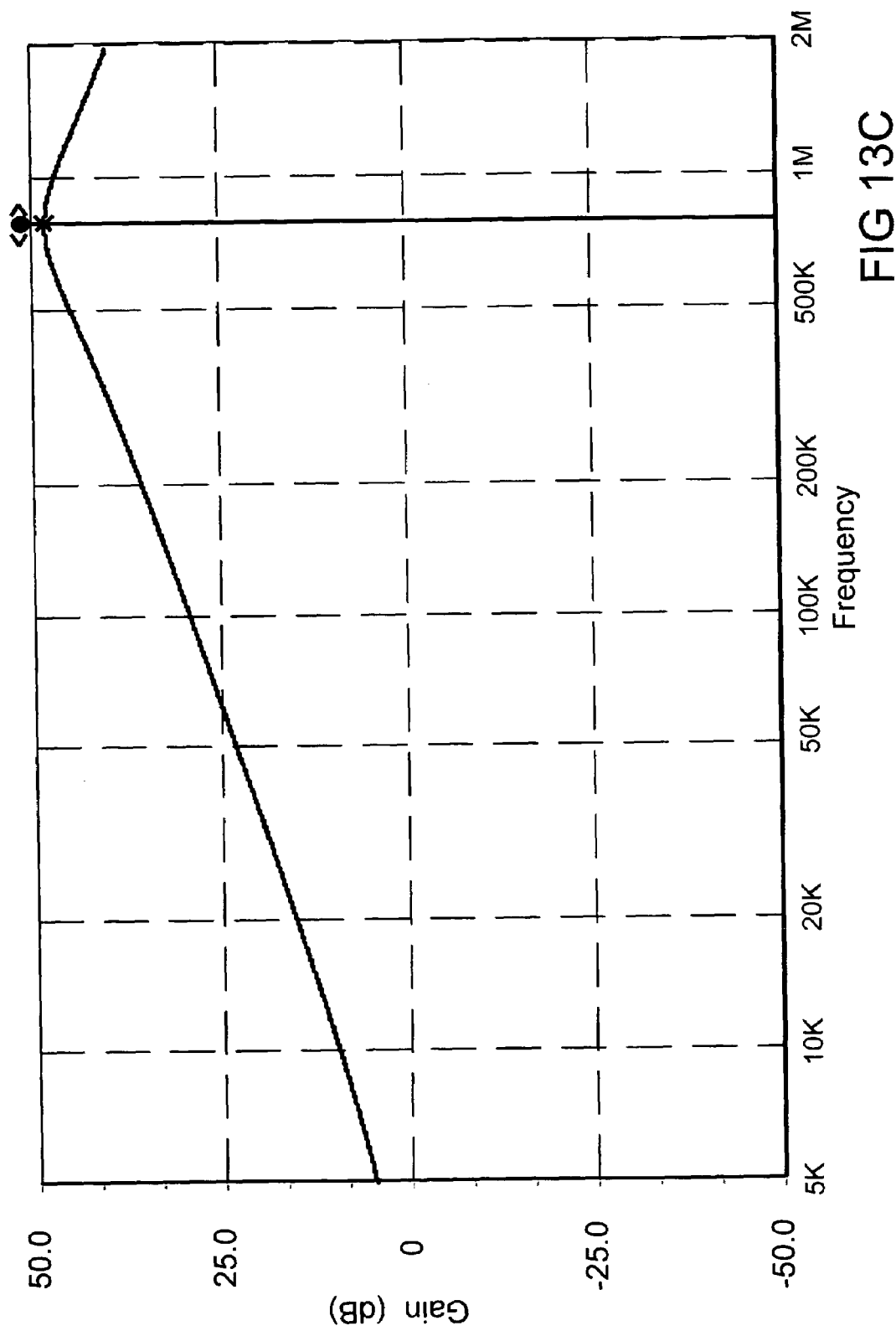

FIG. 13 presents SPICE simulations for various component values. All were done with an Rdfc 812 of 1K ohms. In FIG. 13A Cdbb=33 nF and Rdbb is 10 ohms. Peak gain is at 805 khz and the maximum gain is 43 db. By changing Cdbb 808 to 47 nF we see in FIG. 13B that the peak gain frequency is lowered to 671 khz with little change in maximum gain. Conversely, changing Rdbb 810 to 5 ohms (with Cdbb at 33 nF), we see in FIG. 13C that the frequency stays at 805 khz and the gain is increased to 48 db. The roll off of gain at the peak is sharper for Rdbb=5 ohms than for Rdbb=10 ohms.

The output from AMP1 406 is a single-ended signal on line 407. This signal is presented to toroidal coil 807 of DRIVER1 408 through a current limiting resistor Rdse 809. The purpose of toroidal coil 807 is to once again have differential signals. The secondary of toroidal coil 807 presents differential signals to amplifiers 816 and 818 on lines 815 and 817.

Amplifiers 816 and 818 are the drivers for UTP lines 452 and 454, with coupling provided by MIXER2 410.

The optimum value for the overall gain of AMP1 406 and DRIVER1 408 depends upon both the distance from the CO and the distance from the CPE. Additionally, there is an interplay between the gain of AMP1 406, DRIVER1 408, the maximum power that industry standards will permit on UTP lines 452 and 454, and how effectively the R2/R hybrid coupler in MIXER2 410 can reduce the unwanted downlink signals such that FILTER2 414 can provide AMP2 416 with signals wherein the downlink signals have been adequately attenuated. In one embodiment AMP1 406 and DRIVER1 408 are configured with values for Rdfc 812 and Rdgg 814 per a chart, which chart may be used to configure the BDBEA 100 for the specific distances from the CO and the CPE. An example is shown in FIG. 14. FIG. 14 is for an installation that is 13,500 feet from the CO to the BDBEA 100. Column A lists various distances from the BDBEA 100 to the CPE, from 3,000 feet to 13,000 feet. For each distance one finds a corresponding value for Rdfc 812 in Column B and Rddg 814 in Column C. These values have been determined empirically, considering the trade off factors just described.

MIXER2 410 is connected with DRIVER1 408 via lines 436 and 438. MIXER2 410 passes the downlink signals to UTP wires 452 and 454 which extend to the CPE premises splitter. In addition, voice signals on lines 460 and 462 are physically connected with the UTP lines 452 and 454 at this point (outside of MIXER2 410), thus preserving the bidirectional connection of voice signals between the CO and the CPE. MIXER2 410 is designed and functions identically to MIXER1 2, though obviously the downlink signal is now the unwanted signal and the uplink signal is the desired signal to present to PREAMP2 412. MIXER2 410 is connected with PREAMP2 412 via lines 440 and 442.

As stated, PREAMP2 412 is architecturally identical to PREAMP1 402. The gain of the two preamplifiers may be different, each being set to provide as much gain as possible without clipping. PREAMP2 412 is connected with FILTER2 414 via lines 444 and 446.

Figure 9:
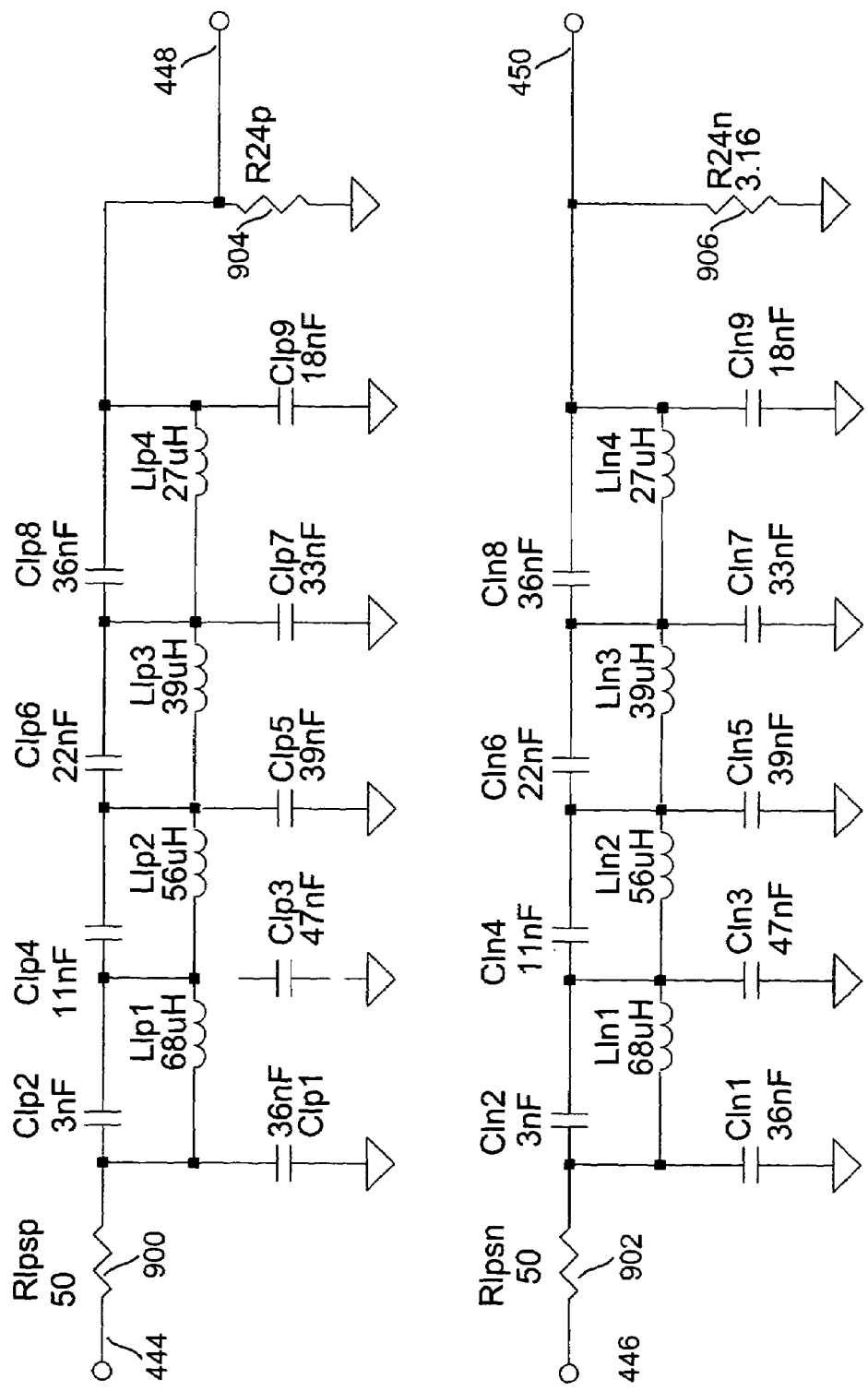
FIG. 9 is a schematic of low pass filter FILTER2.

FILTER2 414 is not the same as FILTER1 404. FILTER2 414 is a low pass filter, whose cutoff frequency is just above 125 khz. The result is the passing of the uplink signals while attenuating the downlink signals. The design shown in FIG. 9 is a ninth order elliptical filter, though as with FILTER1 404 there are many alternative designs of a low pass filter one skilled in the art might chose. Suggested component values for this design are shown. Resistors 900, 902, 904, and 906 selected to provide impedance matching. FILTER2 414 is connected with AMP2 416 via signals on lines 448 and 450. At the output of FILTER2 414 the unwanted downlink signal is approximately 70 db below the uplink signal.

Figure 12:
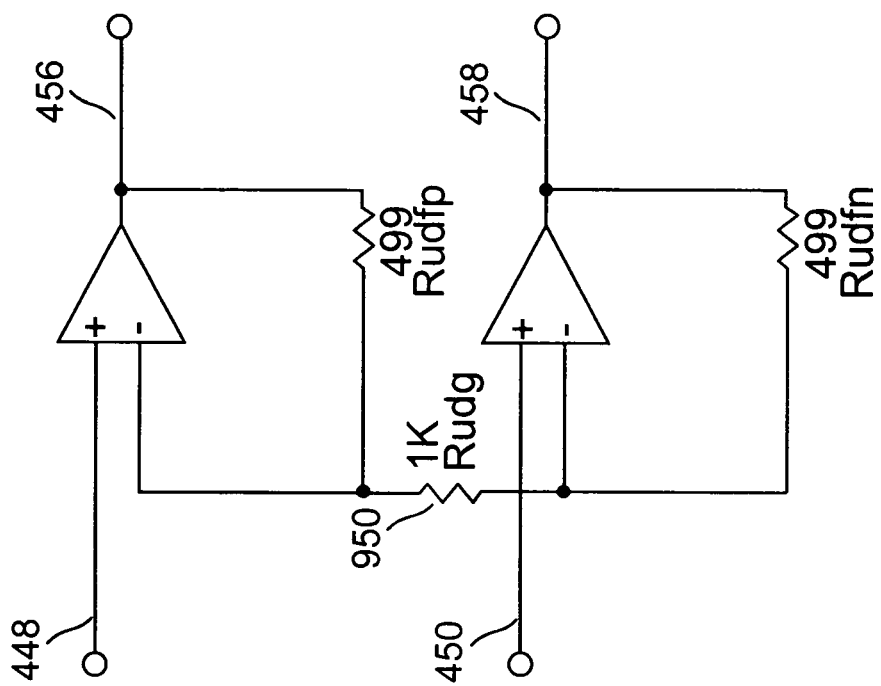
FIG. 12 is a schematic of amplifier AMP2.

AMP2 416, as shown in FIG. 12, is not an equalization amplifier for reasons previously explained. It provides 6 db to 26 db of gain between the input signals on lines 448 and 450 and output signals on lines 456 and 458, which are connected with MIXER1 400. AMP2 416 has enough gain such that a driver stage is not needed. For the same concerns detailed in setting the overall gain of AMP1 404 and DRIVER1 406, AMP2 416 gain is determined empirically. Again referring to FIG. 14, for each distance to the CPE listed in Column A there is a recommended value of Rudg 950 (FIG. 12).

Figure 11:
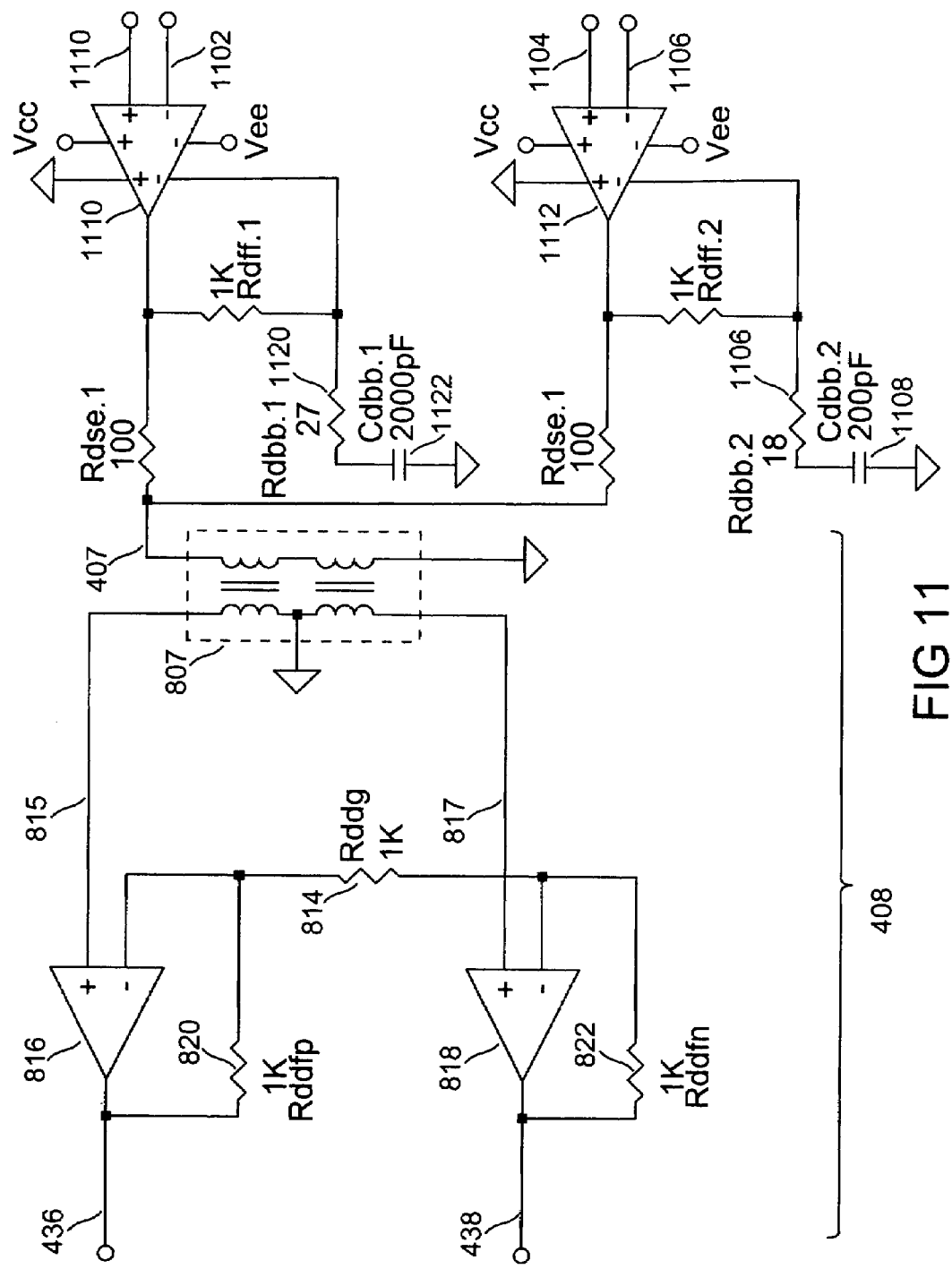
FIG. 11 is a schematic of a plurality of peaking amplifiers and a driver.

In one embodiment, for systems such as ADLS2 and VDSLs, wherein there is a plurality of uplink and/or downlink bands, a filter and an amplifier is provided for each band. Referring again to FIG. 3, for a system with two downlink bands("m" =2) one embodiment includes a FILTER1.1-1 and a FILTER1.1-2, each a band pass filter for the assigned band. Each filter output is connected with an amplifier whose gain and peak gain frequency is tuned for the frequency band of interest. FIG. 11 illustrates how each amplifier is configured. Opamp 1110 receives signals on lines 1100 and 1102 from FILTER1.1-1 304. As described for the ADSL embodiment of AMP1 406, Rdbb.1 1120 and Cdbb.1 1122 are determined for optimum frequency and gain for the assigned band. Opamp 1112 receives signals on lines 1104 and 1106 from FILTER1.2. Because opamp 1112 is presented with signals of a different frequency band than those of opamp 1110, the optimum values for Rdbb.2 1106 and Cdbb.2 1108 are different than for the corresponding components for opamp 1110. The resulting outputs (following current limiting resistors) of these two amplifiers are connected with line 407, which is further connected with toroidal coil 807 in DRIVER1 408.

One skilled in the art will understand this arrangement may be extended to an arbitrary number of uplink and/or downlink frequency bands. In one embodiment the uplink signals are assigned a frequency band for signals that is high enough to cause appreciable signal loss, thus one or more peaking equalizing amplifiers are used. In another embodiment these signals are given another gain stage (DRIVER2 328, FIG. 3) to compensate for the high frequency loss and/or the distance to the CO.

Figure 10:
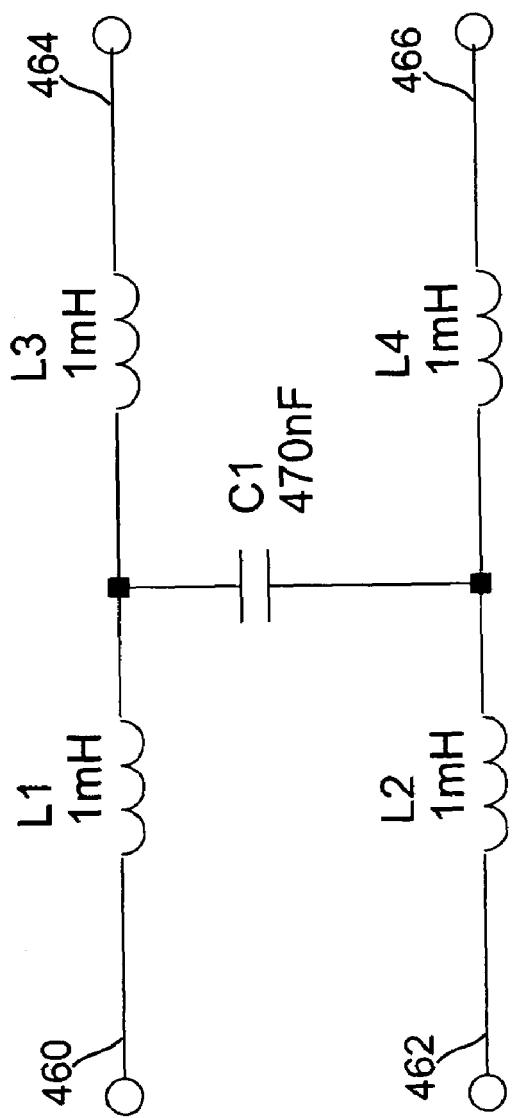
FIG. 10 is a schematic of low pass filter FILTER3.

In one embodiment voice signals are present on the UTP lines between the CO and the CPE. In this case a low pass filter FILTER3 418 passes the signals around the active circuitry of the BDBEA 100. An example of FILTER3 418 is illustrated in FIG. 10, though one skilled in the art will know of several alternative low pass filter designs.

In some DSL systems one set of UTP wires is dedicated to downlink signals and another set of UTP wires is dedicated to uplink signals. There is no provision for voice signals. Since the uplink and downlink signals are separated the amplifier need not provide a mixer or filters, simply an equalization amplifier in each UTP set, with DSL transformers for coupling if desired.

We claim:

1. An electronic circuit, comprising:
    first bidirectional terminals and second bidirectional terminals both for signals in first and second different frequency spectrums;
    a first mixer coupled with the first bidirectional terminals for mixing signals in said first and second frequency spectrums;
    a first amplifier connected with the first mixer;
    one or more first filters connected with the first amplifier for passing the signals in said first frequency spectrum and for blocking the signals in said second frequency spectrum;
    one or more second amplifiers connected with the one or more first filters for amplifying signals in said first frequency spectrum;
    a second mixer for mixing amplified signals in said first frequency spectrum and signals in said second frequency spectrum;
    a third amplifier connected with the second mixer;
    one or more second filters connected with the third amplifier for passing the signals in said second frequency spectrum and for blocking the signals in said first frequency spectrum; and
    one or more fourth amplifiers connected with, said one or more second filters and with the first mixer for amplifying the signals in said second frequency spectrum from said one or more second filters and for providing said amplified signals to said first mixer.

2. The electronic circuit of claim 1, further comprising a driver connected between the one or more fourth amplifiers and the first mixer.

3. The electronic circuit of claim 1, wherein the first mixer further comprises:
    a first transformer comprising primary and secondary coil terminals, said primary coil terminals connected with the first bidirectional terminals and said secondary coil terminals connected with an R2/R hybrid coupler and with a one or more fourth amplifier.

4. The electronic circuit of claim 1, wherein the second mixer comprises:
    a transformer comprising primary and secondary coil terminals, said primary coil terminals connected with the second bidirectional terminals and said secondary coil terminals connected with an R2/R hybrid coupler.

5. The electronic circuit of claim 1 wherein the first amplifier is a differential amplifier.

6. The electronic circuit of claim 5 wherein the differential amplifier is further comprised of a first operational amplifier with its non-inverting input connected with a first differential input and a second operational amplifier with its non-inverting input connected with a second differential input wherein the inverting input of the first operational amplifier is connected with a first terminal of a feedback resistor and the inverting input of the second operational amplifier is connected with a second terminal of the feedback resistor.

7. The electronic circuit of claim 1 wherein the one or more first filters comprises a band pass filter having a passband in said first frequency spectrum.

8. The electronic circuit of claim 1 wherein the one or more second filters comprises a band pass filter having a passband in said second frequency spectrum.

9. The electronic circuit of claim 7 or 8, wherein said band pass filter is a ninth-order elliptical filter.

10. The electronic circuit of claim 9, wherein said filter is a differential filter.

11. The electronic circuit of claim 1 wherein the one or more second amplifier is further comprised of:
    a video difference amplifier connected with a first one or more filter;
    a gain-setting feedback circuit for the video difference amplifier comprising a first resistor connected between the output of the video difference amplifier and its gain setting input, said gain setting input further connected in parallel with said first resistor to a virtual ground reference comprised of a second resistor and a first capacitor in series to ground;
    a current limiting resistor with a first terminal connected with the output of the video difference amplifier and a second terminal connected a first primary coil terminal of a toroidal coil;
    the toroidal coil further comprising a second primary coil terminal, a first secondary coil terminal and a second secondary coil terminal, said second primary coil terminal connected to ground, said first secondary coil terminal connected with the non-inverting input of a first operational amplifier and said second secondary coil terminal connected with the non-inverting input of a second operational amplifier;
    said first and second operational amplifiers connected as a differential amplifier wherein a resistor is connected between the inverting input of the first operational amplifier and the inverting input of the second operational amplifier.

12. The electronic circuit of claim 1 further comprising a low pass filter with a cutoff frequency of the order of 34 khz connected with the first bidirectional terminals and the second bidirectionaL terminals in parallel with the first mixer and the second mixer.

13. The electronic circuit of claim 1, wherein the first and second frequency spectrums each comprise a plurality of non-overlapping frequency bands, and wherein the plurality of frequency bands of the first frequency spectrum are interleaved with the plurality of frequency bands of the second frequency spectrum.

14. The electronic circuit of claim 13, wherein said one or more second amplifiers comprise peaking equalization amplifiers connected to corresponding ones of said one or more filters, wherein each of said peaking equalization amplifiers has a peak gain at a predetermined frequency within a corresponding frequency band of the first frequency spectrum.

15. The electronic circuit of claim 14, wherein the peak gain of each peaking equalization amplifier is determined for each frequency band based upon the impedance of a line coupled to the first bidirectional terminals and the impedance of another line coupled to the second bidirectional terminals.

16. The eLectronic circuit of claim 1, wherein the first bidirectional terminals and the second bidirectional terminals are each coupled to a twisted pair line, and wherein the signals of the first frequency spectrum comprise downlink data signals and the signals of the second frequency spectrum comprise uplink data signals.

17. The electronic circuit of claim 1, wherein the first mixer comprises a transformer having primary and secondary coil terminals, said primary coil terminals being connected with the first bidirectional terminals and said secondary coil terminals being connected with an R/2R hybrid coupler.

18. An electronic circuit, comprising:
first bidirectional terminals;
a first mixer connected with the first bidirectional terminals;
a first amplifier connected with the first mixer;
one or more first filters connected with the first amplifier;
one or more second amplifiers connected with the one or more first filters;
a first driver connected with the one or more second amplifiers;
a second mixer connected with the first driver;
second bidirectional terminals connected with the second mixer;
a third amplifier connected with the second mixer;
one or more second filters connected with the third amplifier; and
a one or more fourth amplifiers connected with the one or more second filters and, wherein the first mixer comprises a transformer having primary and secondary coil terminals, said primary coil terminals being connected with the first bidirectional terminals and said secondary coil terminals being connected with an R2/R hybrid coupler and with a one or more fourth amplifier.

19. An electronic circuit, comprising:
first bidirectional terminals;
a first mixer connected with the first bidirectional terminals;
a first differential amplifier connected with the first mixer;
one or more first filters connected with the first amplifier;
one or more second amplifiers connected with the first one or more filters;
a first driver connected with the one or more second amplifiers;
a second mixer connected with the first driver;
second bidirectional terminals connected with the second mixer;
a third amplifier connected with the second mixer;
one or more second filters connected with the third amplifier;
one or more fourth amplifiers connected with the one or more second filters and further connected with the first mixer,
wherein the first differential amplifier comprises a first operational amplifier with its non-inverting input connected with a first differential input and a second operational amplifier with its non-inverting input connected with a second differential input, and wherein a feedback resistor is connected between an inverting input of the first operational amplifier and an inverting input of the second operational amplifier.

20. An electronic circuit for independently conditioning first and second parallel signal paths in a bidirectional twisted pair telephone line, the first signal path for first signals in a first frequency spectrum and the second signal path for second signals in a second non-overlapping frequency spectrum, comprising:
in a first signal path, a first mixer connected to said line and to the second signal path for mixing first signals from the line and said second signals from said second path;
a first amplifier coupled to an output of the first mixer;
a first filter coupled to the first amplifier for passing the first signals and for blocking the second signals;
a second amplifier coupled to the filter for amplifying the first signals;
and in the second signal path, a second mixer connected to said line for mixing amplified first signals from the first signal path and second signals from the line;
a third amplifier coupled to an output of said second mixer;
a second filter coupled to the third amplifier for passing the second signals and for blocking the first signals;
a fourth amplifier coupled to the second filter and to the first mixer for providing said amplified signals to the first mixer; and
a third low pass filter connected in parallel with the first and second signal paths for third signals in a voice frequency spectrum, said first and second mixers blocking said third signals from said first and second signal paths.

21. The electronic circuit of claim 20, wherein said second frequency spectrum comprises frequencies above said voice frequency spectrum and below said first frequency spectrum.

22. The electronic circuit of claim 20, wherein said second amplifier comprises a peaking equalization amplifier having a frequency-dependent gain with a peak gain at a predetermined frequency in said first frequency spectrum.

23. The electronic circuit of claim 20, wherein said first and second signals respectively comprise downlink and uplink DSL signals.

24. The electronic circuit of claim 23, wherein said DSL signals comprise ADSL signals.

25. The electronic circuit of claim 20, wherein said first and said second signal paths comprise differential signal paths.

* * * * *